No. 745,784. PATENTED DEC. 1, 1903.
J. E. CHAMBERS.
MEANS FOR INSPECTING OR TESTING EYES.
APPLICATION FILED MAR. 11, 1903.
NO MODEL. 3 SHEETS—SHEET 1.
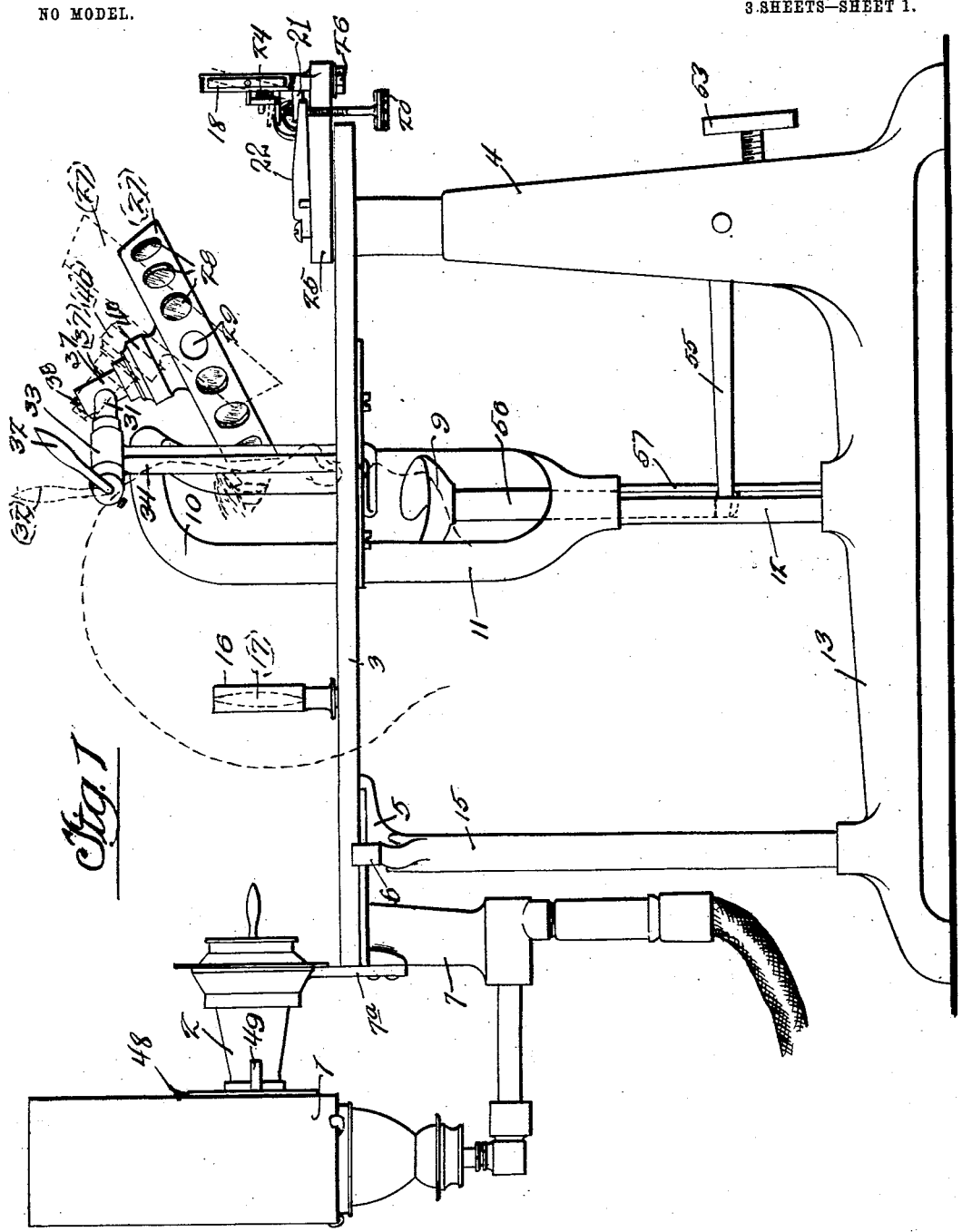

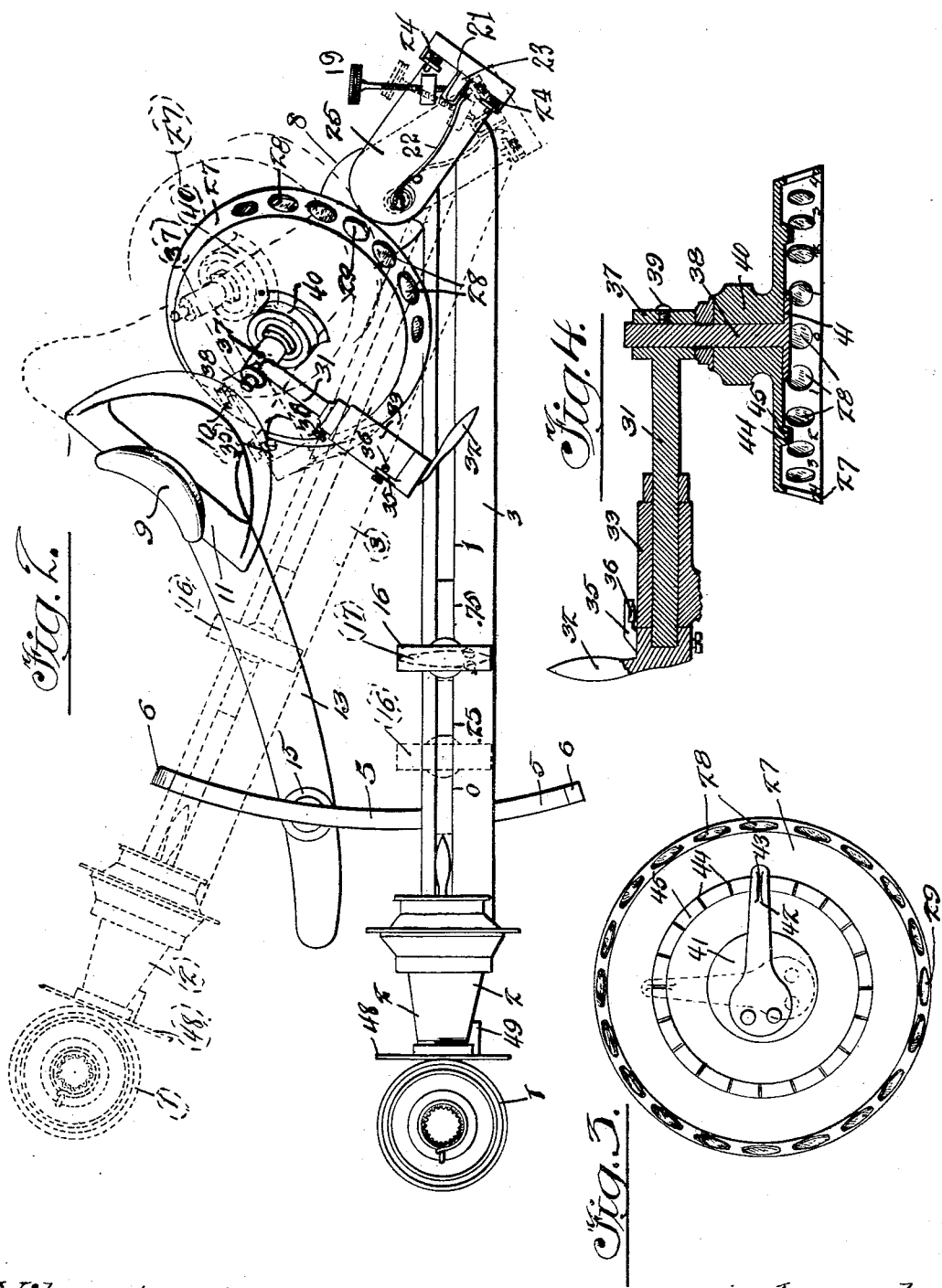

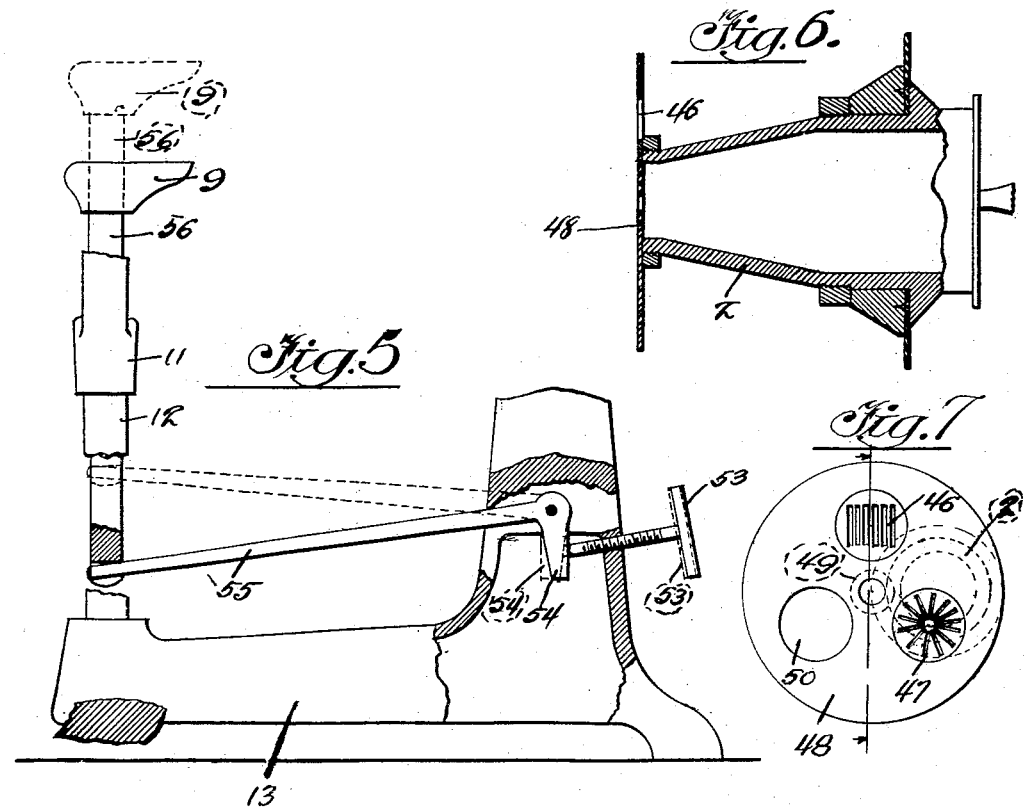
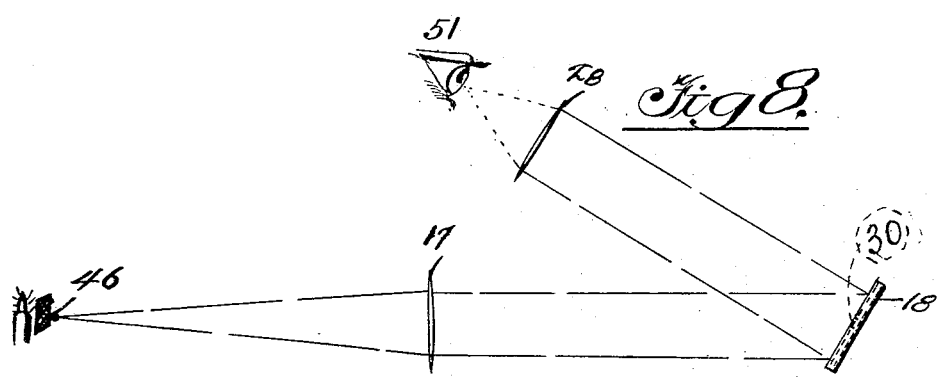

No. 745,784. Patented December 1, 1903.

UNITED STATES PATENT OFFICE.

JOHN E. CHAMBERS, OF CHICAGO, ILLINOIS.

MEANS FOR INSPECTING OR TESTING EYES.

SPECIFICATION forming part of Letters Patent No. 745,784, dated December 1, 1903.

Application filed March 11, 1903. Serial No. 147,249. (No model.)

*To all whom it may concern:*

Be it known that I, JOHN E. CHAMBERS, a citizen of the United States, residing at Chicago, in the county of Cook and State of Illinois, have invented certain new and useful Improvements in Means for Inspecting or Testing Eyes, of which the following is a full, clear, and exact specification.

My invention relates more particularly to testing eyes for the purpose of detecting the presence or absence of ametropia or of astigmatism and whether the same be myopic or hypermetropic and in what degree the refracting system is thus defective; but the invention is nevertheless applicable for other uses, such as those common to the ordinary ophthalmoscope—as, for example, retinoscopy, &c.

The primary object of my invention is to determine errors of the refracting system of the eye by the appearance of an image on the retina resulting from the refraction of the eye itself.

Another object of my invention is to provide improved and efficient means whereby rays of light may be thrown into the eye while the latter is being examined.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 is a side elevation of my improved apparatus. Fig. 2 is a plan view thereof. Fig. 3 is an enlarged detail plan view of the lens-turret. Fig. 4 is a vertical section thereof. Fig. 5 is a detail of the chin-rest-adjusting mechanism, partly in vertical section. Fig. 6 is an enlarged detail sectional view of the lamp-tube. Fig. 7 is a detail face view of the screen-disk, and Fig. 8 is a diagrammatic view illustrating the use of the apparatus.

In carrying out my invention I cast a luminous image upon the retina of the eye and observe this image from without, the image being magnified to that end. If the eye be emmetropic, the image will appear sharply defined on the retina; but if it be either myopic or hypermetropic it will be blurred or indistinct, or if it be astigmatic the image will be indistinct in part, and the part which is indistinct will denote the directions of the principal meridians of the eye, one of which meridians passes through the indistinct part of the image and the other, of course, at right angles to that one, thus, on the one hand, indicating the need of a concave or a convex spherical lens for correcting the simple ametropia, and, on the other hand, a cylinder, concave or convex, with its axis parallel with the meridian of maximum or minimum refraction of the eye for correcting the astigmatism.

To determine whether the ametropic condition be myopia or hypermetropia, the light-rays prior to entering the cornea are diverged or converged in a definite degree until the image on the retina becomes sharply defined, and the degree which the angle of the rays is thus changed will of course denote the number of diopters necessary in a glass to correct the error of the refracting system of the eye, and whether a concave or a convex glass be required will of course depend upon whether the angle of the rays was diverged or converged to produce artificial emmetropia. To thus alter the angularity of the rays prior to entering the eye simply requires, of course, the interposition of a glass or refracting medium, concave for diverging and convex for converging them, and the same method is followed for determining whether the astigmatism be myopic or hypermetropic, the power or diopter of the glass being known or its position with relation to the image being defined in diopters or fractions thereof.

I will now describe my improved apparatus by which I accomplish these and certain other results.

1 is a lamp having a light tube or passage 2, sighted along a horizontal scale-bar 3, which is pivotally mounted at one end on a standard 4 and loosely rests at its other end upon a crossway 5, along which the bar slides as it turns on its pivot, the crossway 5 being provided with stops 6 at each end to prevent dislodgment of the bar, which also carries the lamp by means of a suitable bracket 7 and the tube by bracket 7ª.

To the pivoted end of the bar 3 is formed or secured a shorter horizontal bar or arm 8, extending at an angle to the bar 3 and in the direction of the lamp, and opposite the end of arm 8 is arranged any suitable means for holding and steadying the head of the patient, such as a chin-rest 9 and a forehead-rest 10. The forehead-rest may be in the form of an open frame 11, in the lower end of which the chin-rest is situated, the frame being secured to a standard 12, planted in a branch 13 of a base-frame 14, and which branch 13 also serves to support the crossway 5 on a standard 15.

Slidably mounted on the scale-bar 3 is a lens-carrier 16, provided with lens 17, and at the end of bar 3 remote from the lamp and in line with the axis of the tube 2 and lens 17 is situated a mirror or reflector 18, pivotally mounted on vertical and horizontal axes, so as to be capable of the proper adjustment for reflecting the light from tube 2 directly into the eye while the patient's chin rests on the chin-rest. This adjustment of the reflector may be effected in any suitable way, as by set-screws 19 20, the former of which moves the mirror horizontally in one direction by pressing against a lug 21 on the mirror-frame, while a spring 22, pressing on the other side of such lug, moves it horizontally in the opposite direction. Screw 20 bears upward under a lug 23 on the mirror for tilting the mirror away from the light, and the mirror is moved in the opposite direction by springs 24 when screw 20 is lowered. The mirror, with its mechanism, is mounted on a plate 25, to which the mirror-frame is pivoted by screw or pivot 26, plate 25 being secured to bar 3 in any suitable way.

Between the mirror and head-rest is mounted a lens-holder for holding a lens directly in line with the ray coming through the axis of lens 17, reflected by mirror 18, so that the light from the lamp may be thrown against the retina as the patient's head rests against 9 10. This lens-holder is preferably in the form of a turret, carrying a large number of lenses of different diopters, and a portion of the number are convex and the remainder concave, so that the turret being pivotal it may be quickly rotated for trying the lenses in rapid succession until the proper diopter and form of lens is found.

The turret is constituted by an inverted-pan-shaped member having a flaring rim or flange 27, in which the lenses 28 are situated in suitable apertures, and the two sets of lenses are preferably ranged in two graduated series on either side of a blank-aperture 29, the diopter of lowest power in each series being next the said blank, so that by starting with the blank it may be determined whether the eye is emmetropic or ametropic, and by rotating the turret to bring first one and then the other of the first lenses of the two series opposite the eye it may be determined whether the ametropia, if it exists, is myopic or hypermetropic and the proper diopter of glass for correcting the error of refraction also determined, as will presently be explained more at length.

The lens-turret is pivoted on an oblique axis in such a manner that the lenses in the side of rim 27 adjacent to the eye will be perpendicular and the opposite side of the rim will be elevated out of the line of vision of the oculist, who looks through a suitable peep-hole 30 in the reflector. The rim 27 being comparatively narrow, I am enabled to project it into close propinquity to the eye, and consequently bring the lens very close to the eyeball and be able to rotate the turret without requiring the patient to change his position or causing the turret to annoy the patient by grating against his face. If desired, however, the turret may be tilted up away from the patient, as shown in dotted lines in Fig. 1, and to this end the turret is mounted on a horizontal rocker-shaft 31, provided with a handle 32 and journaled in a suitable bearing 33 on standard 34, mounted on arm 8. The handle 32 is provided with a lug 35 and the bearing 33 with a stop 36, which serve to limit the rotary downward movement of the turret and to hold the same in proper position for use.

The shaft 31 is formed with a collar 37, into which the end of a stem 38, constituting the axial pivot of the turret, is secured by screw 39 or any other suitable means.

Stem 38 passes through a hub 40 on the turret and carries at its inner end a head 41, holding the turret in place and serving for the attachment of a spring-dog 42, having tooth 43, adapted to engage in notches 44 in a flange 45, carried on the under side of the turret, so that accidental rotation of the turret will be prevented.

When the apparatus is to be used for testing the refracting system of the eye, an object is interposed between the lamp and the reflector, and which is thereby thrown as a luminous image on the retina. This object is best interposed between the lamp and the lens 17 and preferably close to the flame of the lamp at the inner end of the tube 2. The object may be of any suitable form, but preferably a regular form, uniform throughout, such as a grating of parallel bars or bars arranged radially. These may be best produced, respectively, by cutting parallel slits 46 and radial slits 47 in a flat disk 48, which is shown as journaled in a bearing 49 on the side of the tube 2 in such a way that either 46 or 47 may be rotated into register with the tube at will. The disk 48 is also provided with a plain opening 50 for use in merely inspecting the eye. It is of course understood that the rays of light shining through the slits 46 47 are reflected by the mirror, and this reflection is thrown upon the retina by the refracting media of the eye in the manner indicated in the diagram Fig. 8, in which 51 represents the eye of the patient. If the eye be normal—that is, emmetropic—the bars of light will appear to the observer sharply defined on the retina when viewed through the blank 29, but of course they would be too small to be seen by the naked eye, and it is one of the functions of the lens 17 to magnify the image in order that the same may be thus seen. If the eye be either myopic or hypermetropic the bars will be indistinct, but may be sharply focused on the retina by interposing the concave or convex lenses 28 (accordingly as the eye is myopic or hypermetropic) until one is found which brings out the image as clearly as possibly; but as the error of the refraction of the eye might be more than a lens 28 of a given number of diopters and less than the next higher one it is important that the lens 17 be capable of adjustment lengthwise of the scale-bar 3 for providing the fractional diopter, and to that end the scale-bar is marked off in quarter-diopters from the zero-point, as indicated in Fig. 2, and the lens-frame 16 is provided with a slide 52, running in a way 53 in bar 3. Hence in starting the examination the lens 17 is placed at zero and the blank 29 is turned into register with the eye.

Should the eye be astigmatic, the image of the bars cannot be clearly defined in whole even by the use of the lenses, but will be indistinct in part, and the location of the image of the indistinct part will indicate the direction of the meridians of minimum and maximum refraction, because one of these passes through the indistinct spot and the other is always at right angles to that one. As to whether the astigmatism be myopic or hypermetropic depends upon whether the indistinct spot shows up clearer with a convex or with a concave glass.

The head-rest preferably bears a fixed relation to the frame 13, but the scale-bar 3 and connected parts may swing laterally on the crossway 5 to adapt the device to the eye under different conditions.

The chin-rest 9 may be adjusted vertically by a screw 53, in standard 4, impinge arm 54 of a bell-crank, whose other arm 55 supports a stem 56, on which the chin-rest is mounted, standard 12 being slotted at 57 for the passage of arm 55.

The operation of the device, briefly described, is as follows: The patient being seated with his chin supported on the rest 9 in the manner indicated in dotted lines in Fig. 1, the operator adjusts the arm 3 and the mirror or reflector to cause the image of the screen 46 or 47 to fall against the retina of the patient's eye through one of the lenses 28, the turret lens-holder being thrown backwardly, as shown in dotted lines in Fig. 1, until the patient's chin and forehead are comfortably supported against the rests 9 10, whereupon the turret lens-holder is allowed to again descend across the bridge of the nose with one of the lenses directly opposite the eye to be tested. The retina being now illuminated by the light passing through the screen and the lens 17 to the reflector and from the reflector to one of the lenses 28, the turret lens-holder is revolved and the lenses therein tried one after another until the image of the screen on the retina of the patient's eye becomes as clearly defined as is possible with any of such lenses, which, as before explained, represent whole or even diopters, the lens 17 at this time being set at zero on the graduated arm 3. The lens 17 may now be moved forward to determine whether the clearness of the image may be improved by an additional fraction of a diopter. If this makes the image less distinct, the operator will know that the diopter of the lens 28 is strong enough; but in order to determine whether it be too strong a lens 28 of a smaller diopter may now be adjusted in front of the patient's eye and the lens 17 then adjusted along the graduated bar 3 until the image on the retina of the patient's eye becomes as clear as is possible. If this degree of clearness requires the lens 17 to be adjusted to the graduation marked "1" on the bar 3, the operator will understand that the lens 28 formerly employed represented the proper diopter; but if it be found that the image is clearest with the lens 17 and one of the decimal or fractional numbers on the bar 3 the operator will understand that the proper diopter of a lens for correcting the sight of the patient's eye will be the diopter of the lens then in front of the eye plus such fraction or decimal, and the glass for the patient's eye will be prescribed accordingly. It may be stated, however, that prior to trying any of the lenses 28 in front of the patient's eye the lens 17 should be set at zero on bar 3 and the vacant aperture 29 of the turret lens-holder adjusted in front of the patient's eye to determine whether the image of the screen 46 is sharply defined on the retina of the patient's eye without the aid of any glass at all. If it be so defined, the operator will understand that natural emmetropia exists and that therefore the patient does not require a glass for either myopia or hypermetropia, whatever be the defect of sight. If the eye be astigmatic, however, a portion of the image of the screen 46 will be indistinct, even though the balance be clearly defined without the aid of a lens, and this will also be the result if the eye be astigmatic in addition to being myopic or hypermetropic, when lenses will be required to produce artificial emmetropia; but the astigmatism will make a part of the image of the screen appear blurred or indistinct, and the location of this indistinct area will denote the directions of the principal meridians of the eye, one of which, as before explained, passes through the indistinct part of the image and the other at right angles to that one. Ametropia will be corrected by a convex or a concave spherical lens of a diopter equal to that indicated by the lens 28 plus the fractional position of lens 17, and the astigmatism will be corrected by a cylinder either convex or concave, according as the eye be myopic or hypermetropic, with its axis running parallel with the meridian of maximum or minimum refraction of the eye.

It will therefore be seen that with the device thus constructed the defect of the patient's eye may be readily and accurately determined by persons having no knowledge whatever of optics or the law of refraction, as the operator is simply required to keep adjusting the lenses 17 and 28 until the image on the retina of the patient's eye appears the clearest, the number of the lens 28 and the fractional number on the scale-bar 3 denoting to the operator the diopter of the lens or glass required for correcting the error of the refracting system of the patient's eye and the location of the blurred spot on the image of the screen, in case the eye be astigmatic, denoting the direction of the axis of the cylinder for correcting such astigmatism.

Having thus described my invention, what I claim as new therein, and desire to secure by Letters Patent, is—

1. In an apparatus of the character described, the combination of a reflector, an object arranged to be thrown by said reflector upon the retina of the eye, means for illuminating said object, and means for focusing said object upon the retina.

2. In an apparatus of the character described, the combination of a reflector, an object arranged to be thrown by said reflector upon the retina of the eye, means for illuminating said object and means for magnifying the image of said object upon the retina.

3. In an apparatus of the character described, the combination of a reflector, an object arranged to be thrown by said reflector upon the retina of the eye, means for illuminating said object and a refracting medium interposed between said object and the reflector.

4. In an apparatus of the character described, the combination of a reflector, an object arranged to be thrown by said reflector upon the retina of the eye, means for illuminating said object and a refracting medium interposed between said object and the reflector and adjustable relatively to said object.

5. In an apparatus of the character described, the combination of a scale-bar having fractions of a diopter marked thereon, a lens adjustable along said scale-bar, a lamp at one end of said bar, and a mirror arranged opposite said lamp and at an angle to the axis of said lens.

6. In an apparatus of the character described, the combination of a lamp, a mirror and a lens bearing a triangular relation to each other, a second lens interposed between said lamp and mirror and an object interposed between the lamp and second lens.

7. In an apparatus of the character described, the combination of a lamp, a mirror and a lens bearing a triangular relation to each other, a second lens interposed between said lamp and mirror and bars interposed between the lamp and second lens.

8. In an apparatus of the character described, the combination of a lamp, a mirror, an object interposed between the lamp and mirror, a lens adjustable, between the lamp and mirror, to the fraction of a diopter and a lens equal to a whole diopter arranged in front of the mirror and to one side of said first lens.

9. In an apparatus of the character described, the combination of a lamp, a mirror, an object interposed between the lamp and mirror, a lens adjustable, between the lamp and mirror, to the fraction of a diopter and a movable series of lenses each equal to one or more diopters arranged before the mirror to one side of said first lens.

10. In an apparatus of the character described, the combination of a series of lenses arranged upright individually and revoluble as a series on an upright axis and means for reflecting rays of light through any one of said lenses.

11. In an apparatus of the character described, the combination of a lens-turret, comprising a flaring rim one side of which is vertical, a series of lenses mounted in said rim, an oblique pivot on which said turret is mounted and means for reflecting light through any one of said lenses.

12. In an apparatus of the character described, the combination of series of lenses arranged upright individually and in an inclined plane as a series, horizontal and oblique pivots on which said series may turn and means for reflecting light through any one of said lenses.

13. In an apparatus of the character described, the combination of series of lenses arranged upright individually and in an inclined plane as a series, horizontal and oblique pivots on which said series may turn, a stop for limiting the downward oscillation of said series, and means for reflecting light through any one of said lenses.

14. In an apparatus of the character described, the combination with a head-rest, of a lamp and a lens rotatably adjustable in unison relatively to said head-rest and a mirror opposite said lamp and lens, said lamp, mirror and rest bearing a triangular relation to each other with the mirror located at the center of said adjustment.

15. In an apparatus of the character described, the combination of a triangular bar laterally adjustable about a pivot, a relatively fixed head-rest, a lens carried on one arm of said bar, a lamp and a lens carried on the other arm thereof and a mirror arranged at the junction of the two arms.

16. In an apparatus of the character described, the combination of a reflector, an object arranged to be thrown by said reflector upon the retina of the patient's eye, means for illuminating said object, and means for focusing said object upon the retina of the patient's eye, said latter means being arranged in the line of the ray of light coming from said illuminating means which passes from said object into the eye of the patient.

17. In an apparatus of the character described, the combination of a reflector, an object of uniform appearance throughout its surface arranged to be thrown by said reflector upon the retina of the eye, means for illuminating said object, and means for focusing said object upon the retina.

JOHN E. CHAMBERS.

Witnesses:
JNO. G. ELLIOTT,
M. B. ALLSTADT.